Dec. 15, 1959     H. A. OMLEY     2,917,140
METAL-TO-CERAMIC SEAL
Filed Nov. 2, 1955
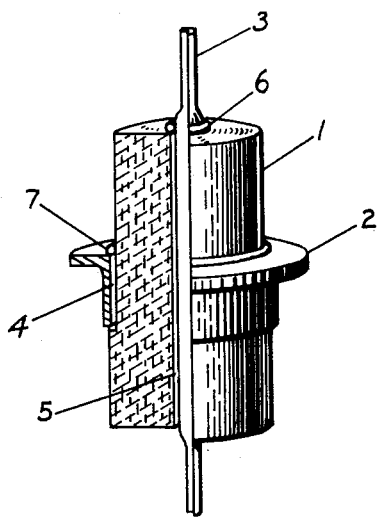
INVENTOR
Herbert A. Omley
by Aram Boyajian
His Agent

2,917,140
METAL-TO-CERAMIC SEAL

Herbert A. Omley, New Lebanon Center, N.Y.

Application November 2, 1955, Serial No. 544,477

1 Claim. (Cl. 189—36.5)

This invention relates to improvements in the materials and processes for making metal-to-ceramic seals.

The accompanying single figure illustrates a ceramic insulator in elevation, partially in section, with electrodes sealed to it by the process and one of the materials of the present invention.

Attempts to seal a metal to a ceramic article have encountered several major problems. One is to find an alloy that, when melted, will wet the ceramic surface and the metal so as to adhere to them when solidified. Another, to have a seal that will not fail under expansion-contraction strains and stresses.

Melted metals and their alloys do not generally wet a ceramic surface, in fact they do not even wet all metals—a drop of mercury will wet a dime but not a penny—and when wetting does not take place, no adhesion is observed when the liquid freezes.

To solve the expansion-contraction problem, there has been a search for metals—elements or alloys—having thermal coefficients the same as those of the ceramic involved and varying similarly over the wide ranges of temperature involved. Such a metal—element or alloy—is not known or used in the industry, and the approximations that are in use—such as various iron-nickel-cobalt alloys—do not always assure a reliable seal, more especially in the case of those seals that are internal to the ceramic. It is an object of the present invention, therefore, to provide more reliable seals under such conditions between such metal electrodes and the ceramics.

To solve the problem of wetting the ceramic surface by a molten metallic sealing alloy, the leading process and sealing alloy are those disclosed by Kelley in his United States Patent No. 2,570,248, and various variations of the so-called Telefunken process are also in use. The present invention is applicable with any one of these processes, and provides a new sealing alloy for such use. In the Kelley process, the ceramic surface is prepared—activated—for wettability by the application of a film of titanium hydride or zirconium hydride to it. For the sealing alloy, Kelley uses the silver-copper eutectic alloy well known in the industry. The sealing operation is carried out by heating in a vacuum not exceeding one micron pressure. When the temperature is raised to 400–500 degrees centigrade, the activating film reacts energetically with the ceramic surface, especially with one of alumina base, and renders that surface wettable by some alloys when molten. Various well-known solders are not well suited here for a couple of reasons. First, because one or more of their components may tend to evaporate at the indicated combination of temperature and vacuum, failing to seal properly. Second, in many instances a metal terminal sealed to the ceramic has to be soldered to a metal container later on; and in this operation, the temperature of the terminal is apt to be raised to a level much higher than the minimum temperature at which the solder will melt. Therefore, the melting point of the sealing alloy must be safely above that of the higher temperature solders by a wide margin. This then implies a minimum melting point of about 400 degrees centigrade for the sealing alloy, and preferably 500–600 degrees centigrade. The upper limit to this temperature is set by expansion-contraction strains, more specifically the contraction strains. The silver-copper eutectic alloy mentioned above solidifies completely just below 800 degrees centigrade, and in cooling down from this high temperature to room temperature, it sets up contraction strains that endanger the seal for terminal metals in ordinary use. It is not a very infrequent occurrence that, on cooling, an inner seal may be found as having broken away from the ceramic, carrying with it a small sliver of the ceramic as ample evidence of good adhesion and excessive contraction strain.

It is another object of the present invention, therefore, to make these seals more reliable with the ordinary metals used for these purposes without resort to the perfect matching of the contraction coefficients of the ceramic and the electrode.

One of the principles of the present invention is to make a very substantial reduction in the temperature drop that the seal undergoes after the alloy is solidified. If the sealing alloy will solidify in the temperature range of 500–600 degrees required or preferred for other reasons as explained above, instead of 800 degrees, there will be a drastic reduction in the strains involved.

Adding up the requirements of a good seal and the objects and principles of the present invention, it will be seen that the goal of the invention is a sealing alloy that will (a) solidify at 500–600 degrees centigrade; (b) will wet, when molten, a ceramic surface activated by said Kelley process, or other equivalent activating process, as well as the common electrode metals mentioned above; and (c) have a vapor tension not in excess of the vacuum pressure used—generally of the order of one micron.

I have discovered that the following two alloys meet this triple specification:

Alloy No. 1
| | Percent |
|---|---|
| Indium | 13 |
| Copper | 27 |
| Silver | 60 |

Alloy No. 2
| | |
|---|---|
| Tin | 10 |
| Copper | 30 |
| Silver | 60 |

The percentages given are approximately the eutectic proportions to realize the lowest solidification temperature. Both alloys melt at about 600 degrees centigrade temperature, and solidify just below that. Both of them wet well the activated ceramic surface and also the usual metal electrodes mentioned above; and both of them make tight reliable internal seals—which are the more difficult seals—with the conventional terminal metals.

To illustrate the practice of the present invention, reference is made to the accompanying single figure in which 1 is a cylindrical ceramic insulator, preferably of alumina base, shown in axial cross section, with a hollow cylindrical external metal electrode 2 preferably of the usual type mentioned above, and a cylindrical internal metal electrode 3, of the same type, both electrodes to be sealed to the insulator. Before the electrodes are inserted in their respective positions, the ceramic surfaces 4 and 5 to be sealed to are coated with a film of titanium hydride, such as by painting thereon a paste of this material. A wire ring 7 of the alloy of the present invention is placed around the porcelain at the upper end of the electrode 2, and similarly a ring 6 of the same alloy is placed around the electrode 3 at the upper end of the insulator 1. The device so prepared is then placed in vacuum maintained at about one micron pressure, and is heated up. At 400–500 degrees centigrade, the titanium hydride film reacts with the alumina surface, and activates it. At about 600 degrees, the alloy rings 6 and 7 fuse and flow into the interspaces between the electrodes and the ceramic, wetting both the electrodes and the activated ceramic surfaces and sealing to them when solidified at a lowered temperature. In articles having a maximum diameter a fraction of an inch, an interspace of a couple of mils is found satisfactory.

Considering the outer seal first, it may be seen that the cooling strains will shrink the outer electrode 2 around the insulator, compressing the insulator and putting the metal in tension. But as ceramics are strong in compression and the metals generally stretchable, the cooling strains tend to produce a tighter seal. The major benefit of the present invention is for the inner seal—that between 1 and 3—where the greater shrinkage of 3 compared with the shrinkage of the ceramic, tends to cause the electrode 3 to pull away from the ceramic surface. Where the adhesion between the sealing alloy and the ceramic surface has been very good, this puts the seal and the adjoining layer of ceramic in tension, and as ceramics are weak in tension, the seal may break away carrying with it a thin layer of porcelain, as has been observed in the prior art with the high-temperature sealing alloys. Strains of this type of course exist in the practice of the present alloy also, but to a very much reduced degree, and may be made harmless by proper design.

The invention having been described and explained in such full, clear, concise and exact terms as to enable those skilled in the art to practice the same, various modifications within the spirit of the invention will occur to those skilled in the art and I aim to include all such modifications and equivalents in the scope of the appended claim.

I claim:

A hermetic seal between a high-alumina ceramic body and a solid metal pin of substantial length and diameter, said pin being of a nickel-iron-cobalt alloy, said seal being internal to said ceramic body and consisting of a silver-copper-indium alloy having approximately the composition of 60% silver, 27% copper, and 13% indium, and fused into direct bonding and sealing engagement with the adjacent metal and ceramic surfaces.

References Cited in the file of this patent

UNITED STATES PATENTS

| | | |
|---|---|---|
| 2,130,879 | Dobke | Sept. 20, 1938 |
| 2,163,407 | Pulfrich | June 20, 1939 |
| 2,219,438 | Beeson | Oct. 29, 1940 |
| 2,456,593 | Polak | Dec. 14, 1948 |
| 2,686,958 | Eber et al. | Aug. 24, 1954 |
| 2,746,140 | Belser | May 22, 1956 |

OTHER REFERENCES

Modern Metals, July 1945, page 7.
The Review of Scientific Instruments, vol. 25, No. 2, pp. 180–183, February 1954.